(12) United States Patent
Tatsumisago et al.

(10) Patent No.: US 9,397,365 B2
(45) Date of Patent: Jul. 19, 2016

(54) SOLID ELECTROLYTE MATERIAL AND ALL SOLID-STATE LITHIUM SECONDARY BATTERY

(75) Inventors: Masahiro Tatsumisago, Sakai (JP);
Akitoshi Hayashi, Sakai (JP); Shigenori Hama, Toyota (JP); Koji Kawamoto, Toyota (JP); Takamasu Ohtomo, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 159 days.

(21) Appl. No.: 13/636,899

(22) PCT Filed: Mar. 25, 2011

(86) PCT No.: PCT/JP2011/057419
§ 371 (c)(1),
(2), (4) Date: Sep. 24, 2012

(87) PCT Pub. No.: WO2011/118799
PCT Pub. Date: Sep. 29, 2011

(65) Prior Publication Data
US 2013/0011746 A1   Jan. 10, 2013

(30) Foreign Application Priority Data
Mar. 26, 2010   (JP) ................................ 2010-072803

(51) Int. Cl.
*H01M 10/0562*  (2010.01)
*H01M 10/052*   (2010.01)
*H01M 2/16*     (2006.01)

(52) U.S. Cl.
CPC ........ *H01M 10/052* (2013.01); *H01M 10/0562* (2013.01); *H01M 2/1646* (2013.01); *H01M 2300/0068* (2013.01); *Y02E 60/122* (2013.01); *Y02T 10/7011* (2013.01)

(58) Field of Classification Search
CPC .......... H01M 10/0562; H01M 10/052; H01M 2300/0068; H01M 2/1646; Y02E 60/122; H02T 10/7011
See application file for complete search history.

(56) References Cited

U.S. PATENT DOCUMENTS 5,512,387 A * 4/1996 Ovshinsky .................... 429/152
6,277,524 B1   8/2001 Kanno
(Continued)

FOREIGN PATENT DOCUMENTS

CN   A-101425604   5/2009
JP   A-11-176236   7/1999
(Continued)

OTHER PUBLICATIONS

Tatsumisago et al. J. Power Sources 159 (2006) 193-199; Apr. 2006.*
International Search Report issued in International Application No. PCT/JP2011/057419 on Jun. 7, 2011 (with translation).

*Primary Examiner* — Ula C Ruddock
*Assistant Examiner* — Lisa S Park
(74) *Attorney, Agent, or Firm* — Oliff PLC (57) ABSTRACT

A solid electrolyte material for an all solid-state lithium secondary battery represented by $Li_2S-M^I{}_aS_b-M^{II}{}_xO_y$, wherein $M^I$ is selected from P, Si, Ge, B and Al; "a" and "b" respectively represent numbers that give a stoichiometric ratio in accordance with the kind of $M^I$; $M^{II}$ is selected from Fe, Zn and Bi; and "x" and "y" respectively represent numbers that give a stoichiometric ratio in accordance with the kind of $M^{II}$.

13 Claims, 3 Drawing Sheets

(56) References Cited

U.S. PATENT DOCUMENTS

| | | | |
|---|---|---|---|
| 2004/0018430 A1* | 1/2004 | Holman et al. | 429/233 |
| 2004/0096670 A1* | 5/2004 | Zguris et al. | 428/426 |
| 2006/0073388 A1* | 4/2006 | Harada et al. | 429/245 |
| 2009/0087751 A1 | 4/2009 | Kondo et al. | |
| 2009/0239153 A1* | 9/2009 | Inda | 429/322 |
| 2010/0040952 A1* | 2/2010 | Kimura et al. | 429/245 |
| 2012/0231348 A1* | 9/2012 | Ohtomo et al. | 429/318 |

FOREIGN PATENT DOCUMENTS

| | | |
|---|---|---|
| JP | A-2005-78985 | 3/2005 |
| JP | 2006-0502959 | 4/2006 |
| JP | A-2008-103288 | 5/2008 |
| JP | A-2008-251520 | 10/2008 |
| JP | A-2010-67499 | 3/2010 |
| WO | 2004/033367 A2 | 4/2004 |

* cited by examiner

SOLID ELECTROLYTE MATERIAL AND ALL SOLID-STATE LITHIUM SECONDARY BATTERY

TECHNICAL FIELD

The present invention relates to a solid electrolyte material and an all solid-state lithium secondary battery. More particularly, the present invention relates to a solid electrolyte material capable of suppressing generation of hydrogen sulfide and to an all solid-state lithium secondary battery.

BACKGROUND ART

Having high voltage and high capacity, a lithium secondary battery is widely used as a power supply for mobile phones, digital cameras, video cameras, notebook computers, electric automobiles and the like. In a lithium secondary battery in public circulation, a liquid electrolyte obtained by dissolving an electrolytic salt in a nonaqueous solvent is used as an electrolyte. Since the nonaqueous solvent includes many combustible solvents, the battery is provided with a safety mechanism.

For simplification of the safety mechanism, there has been proposed an all solid-state lithium secondary battery in which the electrolyte is formed from a solid material, that is, a so-called solid electrolyte material is used without using a nonaqueous solvent. It is reported in Japanese Unexamined Patent Publication No. 2008-103288 (Patent Document 1) that $Li_2S$—$P_2S_5$ can be used for the solid electrolyte material of the battery.

The publication mentions a problem: hydrogen sulfide is generated in a battery in some cases such as when the solid electrolyte material is brought into contact with water in the air due to breakage of the battery or when the raw materials of the solid electrolyte material includes water, because the solid electrolyte material contains sulfur. The publication proposes prevention of leakage of the hydrogen sulfide generated to the outside of the battery by providing the exterior material of the battery with a hydrogen sulfide adsorbing material.

RELATED ART DOCUMENTS

Patent Documents

Patent Document 1: Japanese Unexamined Patent Publication No. 2008-103288

SUMMARY OF THE INVENTION

Problems to be Solved by the Invention

According to the publication, it is possible to prevent the leakage of hydrogen sulfide to the outside of the battery to some extent, but it was not possible to prevent the generation of hydrogen sulfide itself. Accordingly, provision of a solid electrolyte material capable of preventing the generation of hydrogen sulfide itself has been desired.

Means for Solving the Problems

The present invention therefore provides a solid electrolyte material for an all solid-state lithium secondary battery represented by $Li_2S$-$M^I_a S_b$-$M^{II}_x O_y$, wherein $M^I$ is selected from P, Si, Ge, B and Al; "a" and "b" respectively represent numbers that give a stoichiometric ratio in accordance with the kind of $M^I$; $M^{II}$ is selected from Fe, Zn and Bi; and "x" and "y" respectively represent numbers that give a stoichiometric ratio in accordance with the kind of $M^{II}$.

Furthermore, the present invention provides an all solid-state lithium secondary battery comprising: a positive electrode; a negative electrode; and a solid electrolyte layer interposed between the positive electrode and the negative electrode, the solid electrolyte layer containing the above solid electrolyte material.

Effects of the Invention

According to the present invention, it is possible to provide a solid electrolyte material for an all solid-state lithium secondary battery which is capable of suppressing the generation of hydrogen sulfide, and an all solid-state lithium secondary battery.

In addition, when $M^{II}_x O_y$ is selected from $Fe_2O_3$, $ZnO$ and $Bi_2O_3$, it is possible to provide a solid electrolyte material for an all solid-state lithium secondary battery which is capable of suppressing the generation of hydrogen sulfide more.

Furthermore, when $M^I_a S_b$ is $P_2S_5$, possible to provide a solid electrolyte material for an all solid-state lithium secondary battery which has higher charge-discharge capacity and which can be charged and discharged at higher current densities while suppressing the generation of hydrogen sulfide.

In addition, when $Li_2S$-$M^I_a S_b$-$M^{II}_x O_y$ has a composition in which the ratio of $M^{II}_x O_y$ to the total of $Li_2S$ and $M^I_a S_b$ is 60:40 to 95:5 (mole ratio), it is possible to provide a solid electrolyte material for an all solid-state lithium secondary battery which is capable of suppressing the generation of hydrogen sulfide more.

Furthermore, when $Li_2S$-$M^I_a S_b$ contains $Li_2S$ and $M^I_a S_b$ at a ratio of 50:50 to 90:10 (mole ratio), it is possible to provide a solid electrolyte material for an all solid-state lithium secondary battery which has higher charge-discharge capacity and which can be charged and discharged at higher current densities while suppressing the generation of hydrogen sulfide.

In addition, when at least one of the positive electrode and the negative electrode further contains the solid electrolyte material, it is possible to provide an all solid-state lithium secondary battery capable of suppressing the generation of hydrogen sulfide more.

MODE FOR CARRYING OUT THE INVENTION

The solid electrolyte material for an all solid-state lithium secondary battery is composed of a material represented by $Li_2S$-$M^I_a S_b$-$M^{II}_x O_y$.

($M^I_a S_b$)

In $M^I_a S_b$, which is a sulfide, $M^I$ is selected from P, Si, Ge, B and Al; and "a" and "b" respectively represent numbers that give a stoichiometric ratio in accordance with the kind of $M^I$. The five kinds of elements usable as $M^I$ can have various valences, and a and b can be determined according to the valence. For example, P can have a valence of 3 or 5, Si can have a valence of 4, Ge can have a valence of 2 or 4, B can have a valence of 3, and Al can have a valence of 3. Specific examples of $M^I_a S_b$ includes $P_2S_5$, $SiS_2$, $GeS_2$, $B_2S_3$ and $Al_2S_3$. Of these, $P_2S_5$ is particularly preferable.

($M^{II}_x O_y$)

In $M^{II}_x O_y$, which is an oxide, $M^{II}$ is selected from Fe, Zn and Bi; and "x" and "y" respectively represent numbers that give a stoichiometric ratio in accordance with the kind of $M^{II}$. The four kinds of elements usable as $M^{II}$ can have various valences, and "x" and "y" can be determined according to the valence. For example, Fe can have a valence of 2, 3, 4 or 6, Zn can have a valence of 2, and Bi can have a valence of 3 or 5. The oxide represented by $M^{II}_x O_y$ is such a compound that the free energy change in the reaction formula $M^{II}_x O_y + yH_2S \rightarrow M^{II}_x S_y + yH_2O$ is a negative value. For example, $Fe_2O_3$ leads to −44 kJ/mol, ZnO leads to −78 kJ/mol, and $Bi_2O_3$ leads to −232 kJ/mmol.

In short, these oxides are compounds that allow the corresponding sulfides to be stable. Because of the inclusion of such an oxide in the solid electrolyte material, therefore, sulfur can be fixed by the reaction from the oxide to the sulfide before or immediately after hydrogen sulfide is generated due to the contact between the solid electrolyte material and water. Thus, a highly safe solid electrolyte material can be provided.

In addition, because of the inclusion of the oxide represented by $M^{II}_x O_y$, it is also possible to improve the conductivity of the solid electrolyte material. The improvement of the conductivity leads to improvement of the charge-discharge efficiency of the all solid-state lithium secondary battery.

(Mixing ratio of $Li_2S$, $M^I_a S_b$ and $M^{II}_x O_y$)

The mixing ratio of the three components is not particularly limited as long as they are usable as a solid electrolyte material.

Preferably, the ratio of the total of $Li_2S$ and $M^I_a S_b$ to $M^{II}_x O_y$ is 60:40 to 95:5 (mole ratio). When the ratio of the total of the former two components is greater than 95, the generation of hydrogen sulfide may not be suppressed. When the ratio of the total of the two components is smaller than 60, the conductivity may be reduced. A preferable ratio is 70:30 to 90:10, and a more preferable ratio is 75:25 to 85:15.

Preferably, the ratio of $Li_2S$ to $W_a S_b$ is 50:50 to 90:10. When the ratio of $Li_2S$ is smaller than 50 or greater than 90, the conductivity may be reduced and the generation of hydrogen sulfide may not be suppressed. A preferable ratio is 60:40 to 80:20, and a more preferable ratio is 70:30 to 80:20.

(Other Components)

The solid electrolyte material may include other components that are used for an all solid-state lithium secondary battery than the above-described three components. For example, may be mentioned an electrolyte such as LiI and $Li_3PO_4$; an active material such as $LiCoO_2$ and $LiMn_2O_4$; and a binder such as polyvinylidene fluoride, polytetrafluoroethylene, polyvinyl acetate, polymethyl methacrylate and polyethylene.

The active material may have a coat made from a sulfide of a metal selected from Ni, Mn, Fe and Co on a surface thereof. Examples of a method for forming the coat on the active material include a method in which the active material is immersed in a solution containing a precursor of the coat, and then subjected to a heat treatment; and a method in which a solution containing a precursor of the coat is sprayed onto the active material, and then subjected to a heat treatment.

(Method for Preparing Solid Electrolyte Material)

The method for preparing the solid electrolyte material is not particularly limited as long as the method allows mixing of the above-described three components and the other components as needed. In particular, in terms of more uniform mixing of the components, it is preferable to prepare the solid electrolyte material by mechanical milling.

The apparatus and processing conditions for the mechanical milling are not particularly limited as long as they allow uniform mixing of the components.

A ball mill can be usually used as the apparatus. The ball mill is preferable as being capable of providing high mechanical energies. Of ball mills, a planetary ball mill is preferable, because a pot thereof rotates while a supporting disc revolves around the pot, and therefore high impact energies can be produced efficiently.

The processing conditions can be appropriately determined according to the apparatus to use. When a ball mill is used, for example, the materials can be mixed more uniformly when the rotational velocity is higher and/or the processing time is longer. Regarding the expression "and/or", A and/or B means that A or B, or A and B. Specifically, when a planetary ball mill is used, the processing conditions may be a rotational velocity of 50 to 600 revolutions per minute, a processing time of 0.1 to 10 hours and an energy of 1 to 100 kWh per 1 kg of the material mixture. More preferably, the processing conditions may be a rotational velocity of 200 to 500 revolutions per minute, a processing time of 1 to 5 hours and an energy of 6 to 50 kWh per 1 kg of the material mixture.

The mechanical milling may be performed after the three components are put in the apparatus at the same time. Alternatively, the mechanical milling may be performed on two components, and then performed again after the other component is added to the processed product.

(All Solid-State Lithium Secondary Battery)

The all solid-state lithium secondary battery comprises: a positive electrode; a negative electrode; and a solid electrolyte layer interposed between the positive electrode and the negative electrode, and the solid electrolyte layer contains the above-described solid electrolyte material.

(1) Positive Electrode

The positive electrode is not particularly limited, and any positive electrodes that are usually used for all solid-state lithium secondary batteries can be used. The positive electrode may consist only of a positive-electrode active material or may consist of a mixture of a positive-electrode active material, a binder, a conductive agent, an electrolyte and so on.

Examples of the positive-electrode active material include $LiCoO_2$, $LiMnO_2$, $LiVO_2$, $LiCrO_2$, $LiNiO_2$, $Li_2NiMn_3O_8$ and $LiNi_{1/3}Co_{1/3}Mn_{1/3}O_2$.

Examples of the binder include polyvinylidene fluoride, polytetrafluoroethylene, polyvinyl acetate, polymethyl methacrylate and polyethylene.

Examples of the conductive agent include natural graphite, artificial graphite, acetylene black and vapor-grown carbon fiber (VGCF).

As the electrolyte, the above-described solid electrolyte material may be mentioned. The inclusion of the solid electrolyte material also in the positive electrode makes exchange of electrons and ions between the positive electrode and the solid electrolyte layer smoother.

For example, the positive electrode can be obtained by mixing the positive-electrode active material and the optional materials including the binder, the conductive agent and the electrolyte, and pressing the resulting mixture into a pellet form. When a sheet (foil) of a metal or an alloy thereof is used as the positive-electrode active material, it can be used as-is.

The positive electrode may be formed on a current collector such as aluminum or copper.

(2) Negative Electrode

The negative electrode is not particularly limited, and any negative electrodes that are usually used for all solid-state lithium secondary batteries can be used. The negative electrode may consist only of a negative-electrode active material or may consist of a mixture of a negative-electrode active material, a binder, a conductive agent, an electrolyte and so on.

Examples of the negative-electrode active material include metals such as Li, In and Sn; alloys of the metals; graphite; various kinds of transition metal oxides such as $Li_{4/3}Ti_{5/3}O_4$ and SnO; and carbon materials such as graphite.

Examples of the binder include polyvinylidene fluoride, polytetrafluoroethylene, polyvinyl acetate, polymethyl methacrylate and polyethylene.

Examples of the conductive agent include natural graphite, artificial graphite, acetylene black and vapor-grown carbon fiber (VGCF).

As the electrolyte, the above-described solid electrolyte material may be mentioned. The inclusion of the solid electrolyte material also in the negative electrode makes exchange of electrons and ions between the negative electrode and the solid electrolyte layer smoother.

For example, the negative electrode can be obtained by mixing the negative-electrode active material and the optional materials including the binder, the conductive agent and the electrolyte, and pressing the resulting mixture into a pellet form. When a sheet (foil) of a metal or an alloy thereof is used as the negative-electrode active material, it can be used as-is.

The negative electrode may be formed on a current collector such as aluminum or copper.

The all solid-state lithium secondary battery of the present invention can be obtained by stacking the positive electrode, the electrolyte layer and the negative electrode, and pressing them, for example.

EXAMPLES

Hereinafter, the present invention will be described in detail with reference to examples, but the present invention is not limited to the examples.

Comparative Example 1

$Li_2S$ (purity: 99.9%, product by Furuuchi Chemical Corporation) and $P_2S_5$ (purity: 99%, product by Aldrich) in a mole ratio of 67:33 were put into a planetary ball mill. Thereafter, the components were subjected to mechanical milling to give a solid electrolyte material ($67Li_2S.33P_2S_5$). As the planetary ball mill, PULVERISETTE P-7 produced by FRITSCH was used, in which pots and balls are made from zirconium oxide, and the pots having a size of 45 ml contain 500 balls having a diameter of 4 mm. The mechanical milling was performed at a rotational velocity of 510 rpm for 20 hours in a dry nitrogen glove box at room temperature.

Comparative Example 2

A solid electrolyte material ($75Li_2S.25P_2S_5$) was obtained in the same manner as in Example 1 except that the mole ratio between $Li_2S$ and $P_2S_5$ was changed to 75:25.

Comparative Example 3

The solid electrolyte material of Comparative Example 2 and $SiO_2$ (product by Aldrich) in a mole ratio of 70:30 were put into a planetary ball mill. Thereafter, the components were subjected to mechanical milling to give a solid electrolyte material ($70(75Li_2S.25P_2S_5)30SiO_2$). As the planetary ball mill, PULVERISETTE P-7 produced by FRITSCH was used, in which pots and balls are made from zirconium oxide, and the pots having a size of 45 ml contain 500 balls having a diameter of 4 mm. The mechanical milling was performed at a rotational velocity of 230 rpm for 2 hours in a dry nitrogen glove box at room temperature.

Example 1

A solid electrolyte material ($90(67Li_2S.33P_2S_5)10Fe_2O_3$) was obtained in the same manner as in Comparative Example 3 except that the solid electrolyte material of Comparative Example 1 and $Fe_2O_3$ (product by Kojundo Chemical Lab. Co., Ltd.) in a mole ratio of 90:10 were put into the planetary ball mill.

Example 2-1

A solid electrolyte material ($90(67Li_2S.33P_2S_5)10ZnO$) was obtained in the same manner as in Comparative Example 3 except that the solid electrolyte material of Comparative Example 1 and ZnO (product by Aldrich) in a mole ratio of 90:10 were put into the planetary ball mill.

Example 2-2

A solid electrolyte material ($70(67Li_2S.33P_2S_5)30ZnO$) was obtained in the same manner as in Comparative Example 3 except that the solid electrolyte material of Comparative Example 1 and ZnO in a mole ratio of 70:30 were put into the planetary ball mill.

Example 3-1

A solid electrolyte material ($90(75Li_2S.25P_2S_5)10ZnO$) was obtained in the same manner as in Comparative Example 3 except that the solid electrolyte material of Comparative Example 2 and ZnO in a mole ratio of 90:10 were put into the planetary ball mill.

Example 3-2

A solid electrolyte material ($70(75Li_2S.25P_2S_5)30ZnO$) was obtained in the same manner as in Comparative Example 3 except that the solid electrolyte material of Comparative Example 2 and ZnO in a mole ratio of 70:30 were put into the planetary ball mill.

Example 4

A solid electrolyte material ($90(75Li_2S.25P_2S_5)10Bi_2O_3$) was obtained in the same manner as in Comparative Example 3 except that the solid electrolyte material of Comparative Example 2 and $Bi_2O_3$ (product by Aldrich) in a mole ratio of 90:10 were put into the planetary ball mill.

Example 5

A solid electrolyte material $(90(75Li_2S.25P_2S_5)10Fe_2O_3)$ was obtained in the same manner as in Comparative Example 3 except that the solid electrolyte material of Comparative Example 2 and $Fe_2O_3$ in a mole ratio of 90:10 were put into the planetary ball mill.

(Measurement of Amount of Hydrogen Sulfide Generation)

The solid electrolyte materials of Examples 1 to 4 and Comparative Examples 1 to 3 were measured for the amount of hydrogen sulfide generation according to the following method.

That is, each solid electrolyte material weighted to be 100 mg was pressed to be pelletized at a pressure of 5.1 t/cm$^2$ with a pelletizing machine having a shaping section having an area of 0.785 cm$^2$. The pellet obtained was placed in a hermetically-closed desiccator (1755 cc, atmosphere: air, temperature: 25° C., humidity: 40%) and measured for the amount of hydrogen sulfide generation over time by using a hydrogen sulfide sensor.

Figure 1:
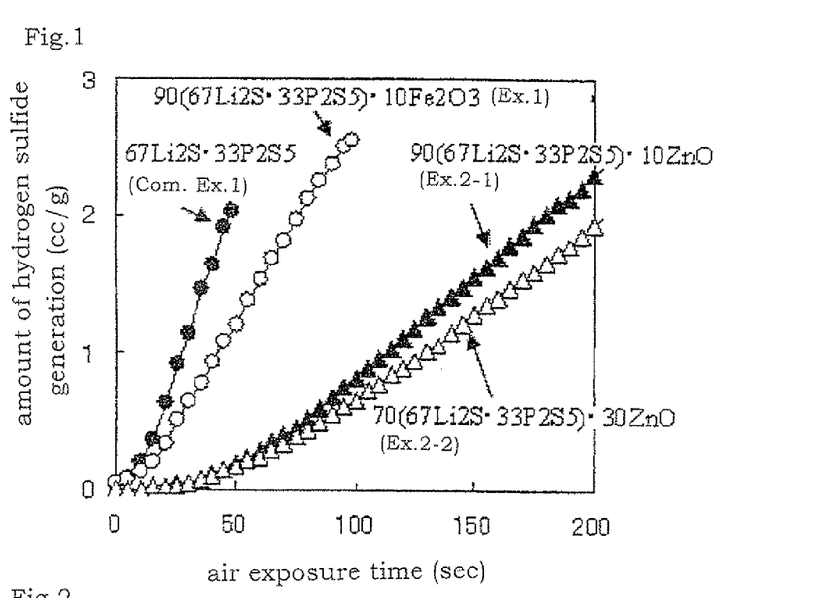
FIG. 1 is a graph showing the relationship between the air exposure time and the amount of hydrogen sulfide generation of solid electrolyte materials of examples of the present invention and a comparative example.
Figure 2:
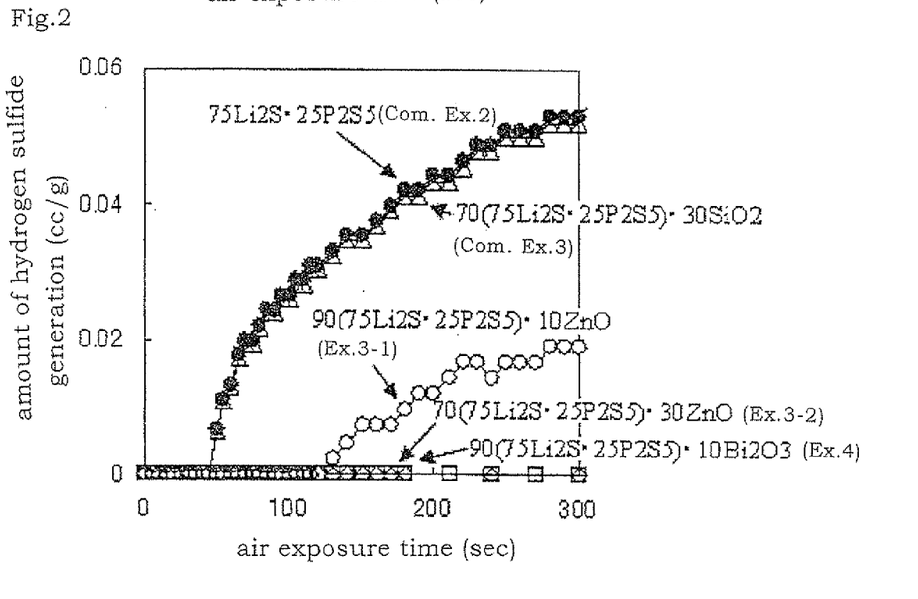
FIG. 2 is a graph showing the relationship between the air exposure time and the amount of hydrogen sulfide generation of solid electrolyte materials of examples of the present invention and comparative examples.

FIG. 1 shows measurement results of Example 1, Example 2-1, Example 2-2 and Comparative Example 1, and FIG. 2 shows measurement results of Example 3-1, Example 3-2, Example 4, Comparative Example 2 and Comparative Example 3.

FIG. 1 indicates the following: the amount of hydrogen sulfide generation can be reduced to ⅗ when 10 mole % of $Fe_2O_3$ is added to $67Li_2S.33P_2S_5$ (Example 1); the amount of hydrogen sulfide generation can be reduced to ½ when 10 mole % of ZnO is added (Example 2-1); and the amount of hydrogen sulfide generation can be reduced to ⅓ when 30 mole % of ZnO is added (Example 2-2). FIG. 1 shows that the rates of hydrogen sulfide generation in Comparative Example 1, Example 1 and Example 2-1 are 0.0263 cc/sec/g, 0.0163 cc/sec/g and 0.0127 cc/sec/g, respectively.

FIG. 2 indicates the following: the amount of hydrogen sulfide generation does not change even when 30 mole % of $SiO_2$ is added to $75Li_2S.25P_2S_5$ (Comparative Example 3); the amount of hydrogen sulfide generation can be reduced to ½ when 10 mole % of ZnO is added (Example 3-1); the amount of hydrogen sulfide generation can be reduced to a measurement limit or less when 30 mole % of ZnO is added (Example 3-2); and the amount of hydrogen sulfide generation can be reduced to a measurement limit or less when 10 mole % of $Bi_2O_3$ is added (Example 4). FIG. 2 shows that the rates of hydrogen sulfide generation in Comparative Example 2, Example 3-1 and Example 4 are 0.00008 cc/sec/g, 0.00004 cc/sec/g and the measurement limit or less, respectively.

(Structure Analysis of Solid Electrolyte Material Before and After Hydrogen Sulfide Generation)

Figure 3:
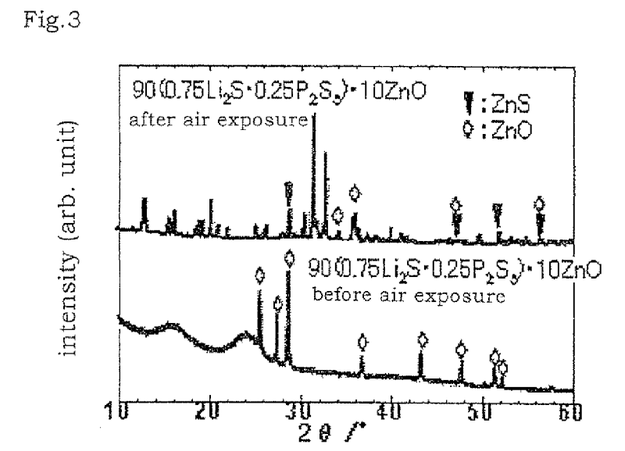
FIG. 3 is a graph showing structural change of a solid electrolyte material of an example of the present invention between before and after hydrogen sulfide generation.
Figure 4:
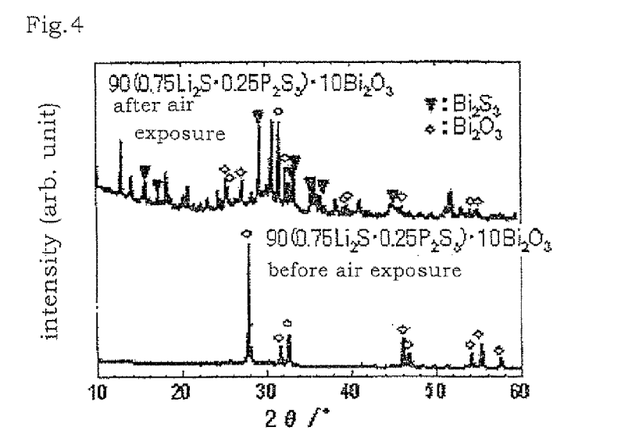
FIG. 4 is a graph showing structural change of a solid electrolyte material of an example of the present invention between before and after hydrogen sulfide generation.
Figure 5:
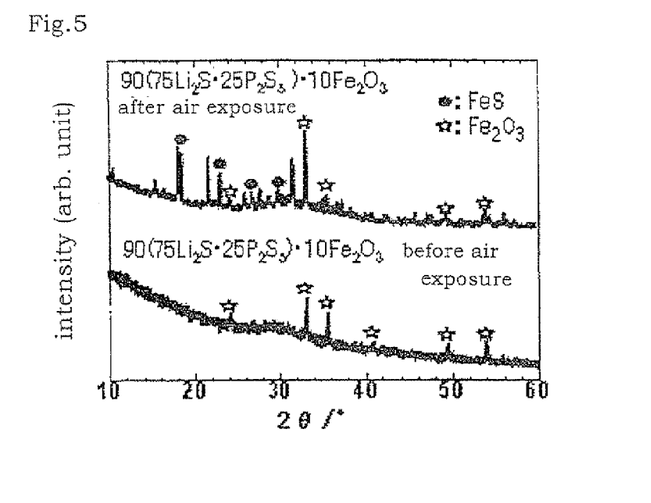
FIG. 5 is a graph showing structural change of a solid electrolyte material of an example of the present invention between before and after hydrogen sulfide generation.

The structures of the solid electrolyte materials of Example 3-1, Example 4 and Example 5 before and after the hydrogen sulfide generation were analyzed by using an X-ray diffractometer (Ultima IV, product by Rigaku Corporation). FIGS. 3 to 5 show the results.

In FIGS. 3 to 5, the solid electrolyte materials after the hydrogen sulfide generation show peaks of ZnS corresponding to ZnO, peaks of $Bi_2S_3$ corresponding to $Bi_2O_3$ and peaks of FeS corresponding to $Fe_2O_3$, indicating that sulfur atoms before changing into hydrogen sulfide were successfully captured.

(Conductivity)

The solid electrolyte materials of Example 3-1, Example 4 and Comparative Example 2 were measured for the conductivity according to the following method.

Each solid electrolyte material weighted to be 100 mg was pressed to be pelletized at a pressure of 5.1 t/cm$^2$ with a pelletizing machine having a shaping section having an area of 0.785 cm$^2$. The pellet obtained was coated with a carbon paste, which is to function as electrodes, at opposite sides and put in a stainless current collector to give a measurement cell. An alternate current impedance measurement was performed on the cell under a dry argon atmosphere by using an impedance analyzer (model 1260, product by Solartron) at a frequency in a range from 10 Hz to 8 MHz to determine the conductivity.

The conductivity of the solid electrolyte material of Example 3-1 was $1.4 \times 10^{-4}$ S/cm, the conductivity of the solid electrolyte material of Example 4 was $1.6 \times 10^{-4}$ S/cm, and the conductivity of the solid electrolyte material of Comparative Example 2 was $5.5 \times 10^{-4}$ S/cm (all the values were those at 25° C.), revealing that a high conductivity in the order of $10^{-4}$ S/cm can be maintained even when an oxide is included.

(Current Value According to Direct Current Polarization Measurement)

In a glove box under a dry argon atmosphere, 0.1 g of the solid electrolyte material of Example 3-1 $(90(75Li_2S.25P_2S_5)10ZnO)$ was uniaxially pressed with a hydraulic pump at 200 MPa for 1 minute to give a pellet having a diameter of 10 mm and a thickness of 1 mm. Pellets thus prepared were used as a solid electrolyte (SE).

A lithium sheet (product by Furuuchi Chemical Corporation, 0.25 mm in thickness, 99.9% in purity; hereinafter, abbreviated as Li) punched out into a diameter of 9 mm was pasted onto a stainless steel rod (SUS316, 10 mm in diameter, 150 mm in length; hereinafter abbreviated as SUS) being a current collector to give a Li electrode. The solid electrolyte pellets were each sandwiched between a pair of Li electrodes or a pair of SUS electrodes (without the Li sheet) at both sides to give measurement cells. The configurations of the measurement cells were SUS/SE/SUS and Li/SE/Li.

Since the SUS electrodes are ion blocking electrodes, a direct current by electronic conduction can be obtained from the cell having the configuration of SUS/SE/SUS. On the other hand, since the Li electrodes are ion non-blocking electrodes, a direct current by lithium ion conduction and electronic conduction can be obtained from the cell having the configuration of Li/SE/Li.

Figure 6:
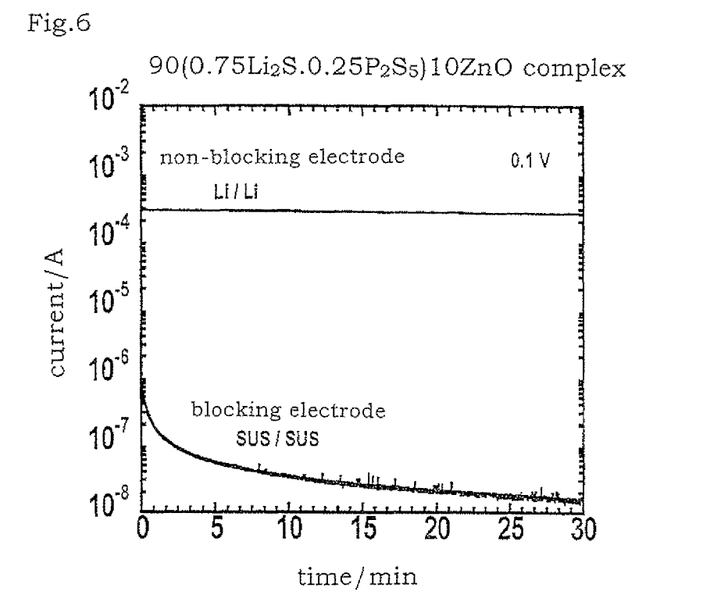
FIG. 6 is a graph showing results of a measurement of a solid electrolyte material of an example of the present invention for the direct current value.

The two measurement cells were measured for the direct current by using a potentiostat SI-1287 available from TOYO corporation under the conditions of an applied voltage of 0.1 V and an application time of 1800 sec. FIG. 6 shows the results.

FIG. 6 shows that a constant current value is obtained with the cell having the configuration of Li/SE/Li. The resistance of the electrolyte was determined from the current value obtained and the applied voltage, and the resistance was converted into the conductivity which was $3.1 \times 10^{-4}$ S/cm. This value substantially agrees with the conductivity calculated according to the alternate current impedance measurement in the preceding (Conductivity) section.

With the cell having the configuration of SUS/SE/SUS, on the other hand, large polarization was observed in an initial stage of the voltage application. In addition, the conductivity determined from a steady-state current value (30 minutes later) was as extremely small as $1.9 \times 10^{-9}$ S/cm.

The conductivities of the two cells indicate that this solid electrolyte has extremely small electron conductivity and the ionic transport number thereof is substantially one.

(Galvanostatic Charge-Discharge Test)

An all solid-state bipolar cell (all solid-state secondary battery) was used in this test.

For the positive electrode for forming the cell, a pellet having a diameter of 10 mm obtained by pressing a positive-electrode complex was used. For the positive-electrode complex, the one obtained by mixing a positive-electrode active material comprising $LiCoO_2$ (product by Toda Kogyo Corp.) coated with $LiNbO_3$ and the solid electrolyte material of Example 3-1 (90(75$Li_2$S.25$P_2S_5$)10ZnO) in a weight ratio of 70:30 in an agate mortar was used.

For the solid electrolyte, a pellet having a diameter of 10 mm obtained by pressing the solid electrolyte material of Example 3-1 (90(75$Li_2$S.25$P_2S_5$)10ZnO) was used.

For the negative electrode, an indium sheet (product by Furuuchi Chemical Corporation, 0.1 mm in thickness, 99.999% in purity) punched out into a diameter of 9 mm was used.

Specifically, 80 mg of the solid electrolyte and 10 mg of the positive-electrode complex were stacked, and then uniaxially pressed by using a hydraulic pressing machine at 3700 kg/cm$^2$ for 5 minutes to give a pellet composed of two layers: an electrolyte layer and a positive electrode.

Next, a negative electrode was stacked on the electrolyte layer, and the layered product was uniaxially pressed again at 2500 kg/cm$^2$ for 2 minutes to give an all solid-state bipolar cell.

The above-described processes were performed in a glove box under a dry argon atmosphere.

Figure 7:
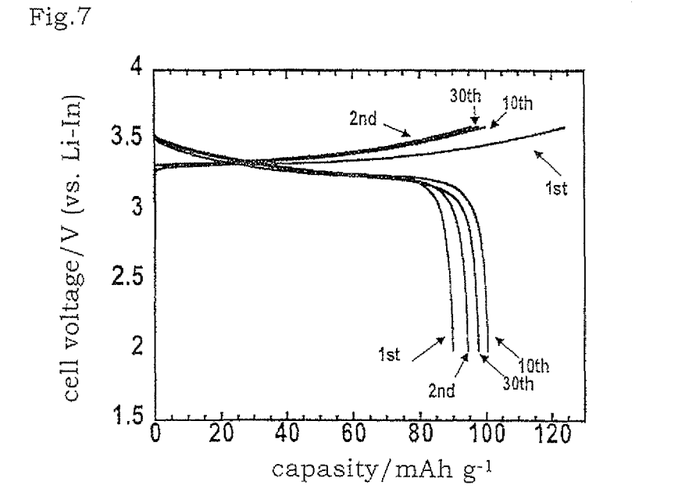
FIG. 7 is a graph showing results of a charge-discharge test on an all solid-state secondary battery including a solid electrolyte material of an example of the present invention.

The cell obtained was put between stainless steel current collectors and placed in a glass container in which the atmosphere had been replaced with argon gas, and then the glass container was hermetically sealed. Thereafter, the cell was taken out of the glove box. The cell obtained was subjected to the charge-discharge test by using a charge-discharge testing apparatus (BST-2004) produced by NAGANO. The test was performed at a current density of 0.13 mA/cm$^2$ and at a temperature of 25° C. During the test, the temperature was kept constant by using a low-temperature incubator (model LTI-1001SD) produced by Tokyo Rikakiki Co., Ltd. FIG. 7 shows the test results.

FIG. 7 has revealed that the cell prepared can be charged and discharged at room temperature, and it works as an all solid-state secondary battery. It has been also revealed that a capacity of approximately 100 mAh/g with respect to the weight of $LiCoO_2$ can be maintained even after the charge and discharge for the 30th cycle.

What is claimed is:

1. A solid electrolyte material for an all solid-state lithium secondary battery represented by $Li_2S$-$M^I_aS_b$-$M^{II}_xO_y$,
   wherein:
   $M^I$ is selected from P, Si, Ge, B and Al;
   "a" and "b" respectively represent numbers that give a stoichiometric ratio in accordance with the kind of $M^I$;
   $M^{II}$, "x," and "y" are selected such that $M^{II}_xO_y$ is $Bi_2O_3$;
   $M^{II}_xO_y$ is less stable than $M^{II}_xS_y$;
   the $Li_2S$-$M^I_aS_b$-$M^{II}_xO_y$ has a composition in which the ratio of $M^{II}_xO_y$ to the total of $Li_2S$ and $M^I_aS_b$ is 60:40 to 95:5 (mole ratio); and
   said solid electrolyte material is:
   (i) used for the all solid-state lithium secondary battery comprising a positive electrode, a solid electrolyte layer, and a negative electrode;
   (ii) contained in any of the positive electrode, the solid electrolyte layer, and the negative electrode; and
   (iii) capable of suppressing generation of hydrogen sulfide.

2. The solid electrolyte material for an all solid-state lithium secondary battery of claim 1, wherein the $M^I_aS_b$ is $P_2S_5$.

3. The solid electrolyte material for an all solid-state lithium secondary battery of claim 1, wherein the $Li_2S$-$M^I_aS_b$-$M^{II}_xO_y$ has a composition in which the ratio of $Li_2S$ and $M^I_aS_b$ is 50:50 to 90:10 (mole ratio).

4. An all solid-state lithium secondary battery comprising: a positive electrode; a negative electrode; and a solid electrolyte layer interposed between the positive electrode and the negative electrode, the solid electrolyte layer containing the solid electrolyte material of claim 1.

5. The all solid-state lithium secondary battery of claim 4, wherein at least one of the positive electrode and the negative electrode further contains the solid electrolyte material for the all solid-state lithium secondary battery.

6. The solid electrolyte material for an all solid-state lithium secondary battery of claim 1, wherein $M^I$, "a," and "b" are selected such that $M^I_aS_b$ is $Al_2S_3$.

7. A solid electrolyte material for an all solid-state lithium secondary battery represented by $Li_2S$-$M^I_aS_b$-$M^{II}_xO_y$,
   wherein $M^I$ is selected from P, Si, Ge, B and Al;
   "a" and "b" respectively represent numbers that give a stoichiometric ratio in accordance with the kind of $M^I$;
   $M^{II}$ is selected from Fe, Zn, and Bi;
   "x" and "y" respectively represent numbers that give a stoichiometric ratio in accordance with the kind of $M^{II}$; and
   the $Li_2S$-$M^I_aS_b$-$M^{II}_xO_y$ has a composition in which the ratio of $M^{II}_xO_y$ to the total of $Li_2S$ and $M^I_aS_b$ is 60:40 to 95:5 (mole ratio).

8. An all solid-state lithium secondary battery, comprising:
   a positive electrode;
   a negative electrode;
   a solid electrolyte layer interposed between the positive electrode and the negative electrode; and
   a solid electrolyte material contained in the solid electrolyte layer and throughout at least one of the positive electrode and the negative electrode, wherein:
   the solid electrolyte material is represented by $Li_2S$-$M^I_aS_b$-$M^{II}_xO_y$, in which:
   $M^I$ is selected from P, Si, Ge, B and Al;
   "a" and "b" respectively represent numbers that give a stoichiometric ratio in accordance with the kind of $M^I$;
   $M^{II}$ is selected from Fe, Zn, and Bi; and
   "x" and "y" respectively represent numbers that give a stoichiometric ratio in accordance with the kind of $M^{II}$; and
   the $Li_2S$-$M^I_aS_b$-$M^{II}_xO_y$ has a composition in which the ratio of $M^{II}_xO_y$ to the total of $Li_2S$ and $M^I_aS_b$ is 60:40 to 95:5 (mole ratio).

9. The solid electrolyte material for an all solid-state lithium secondary battery of claim 7, wherein the $M^{II}_xO_y$ is selected from $Fe_2O_3$, ZnO and $Bi_2O_3$.

10. The solid electrolyte material for an all solid-state lithium secondary battery of claim 7, wherein the $M^I_aS_b$ is $P_2S_5$.

11. The solid electrolyte material for an all solid-state lithium secondary battery of claim 7, wherein the $Li_2S$-$M^I_a$ $S_b$-$M^{II}_xO_y$ has a composition in which the ratio of $Li_2S$ and $M^I_aS_b$ is 50:50 to 90:10 (mole ratio).

12. An all solid-state lithium secondary battery comprising: a positive electrode; a negative electrode; and a solid electrolyte layer interposed between the positive electrode and the negative electrode, the solid electrolyte layer containing the solid electrolyte material of claim 7.

13. The all solid-state lithium secondary battery of claim 12, wherein at least one of the positive electrode and the negative electrode further contains the solid electrolyte material for the all solid-state lithium secondary battery.

* * * * *